(12) United States Patent
Martinez

(10) Patent No.: US 6,466,603 B1
(45) Date of Patent: Oct. 15, 2002

(54) LOW LOSS RESONATOR

(76) Inventor: Erick Martinez, 13377 SW. 43 Ln., Miami, FL (US) 33175

(*) Notice: Subject to any disclaimer, the term of this patent is extended or adjusted under 35 U.S.C. 154(b) by 0 days.

(21) Appl. No.: 09/528,555

(22) Filed: Mar. 20, 2000

(51) Int. Cl.[7] ............................... H01S 3/08; G02B 5/10
(52) U.S. Cl. ......................... 372/92; 372/99; 372/101; 359/852
(58) Field of Search ..................... 372/92, 99, 72, 372/98, 101; 359/852

(56) References Cited

U.S. PATENT DOCUMENTS

| | | | |
|---|---|---|---|
| 4,357,704 A | * | 11/1982 | Koecherner .................. 372/72 |
| 4,935,939 A | * | 6/1990 | Liau et al. ..................... 372/98 |
| 5,235,470 A | * | 8/1993 | Cheng ........................ 359/852 |

* cited by examiner

*Primary Examiner*—Paul Ip
*Assistant Examiner*—Armando Rodriguez
(74) *Attorney, Agent, or Firm*—J. Sanchelima; A. Bordas

(57) ABSTRACT

A Low loss resonator is provided, which consist of two confocal parabolic reflectors and two flat reflectors forming a closed cavity capable of direct to the output window, stimulated emissions generated in the axes parallels to the axis of symmetry and the radial axes, being the point of origin of the radial axes the common focal point of the parabolic reflectors. The Low loss resonator has the advantage of extract energy from the active medium more efficiently than cylindrical shaped resonators.

1 Claim, 1 Drawing Sheet

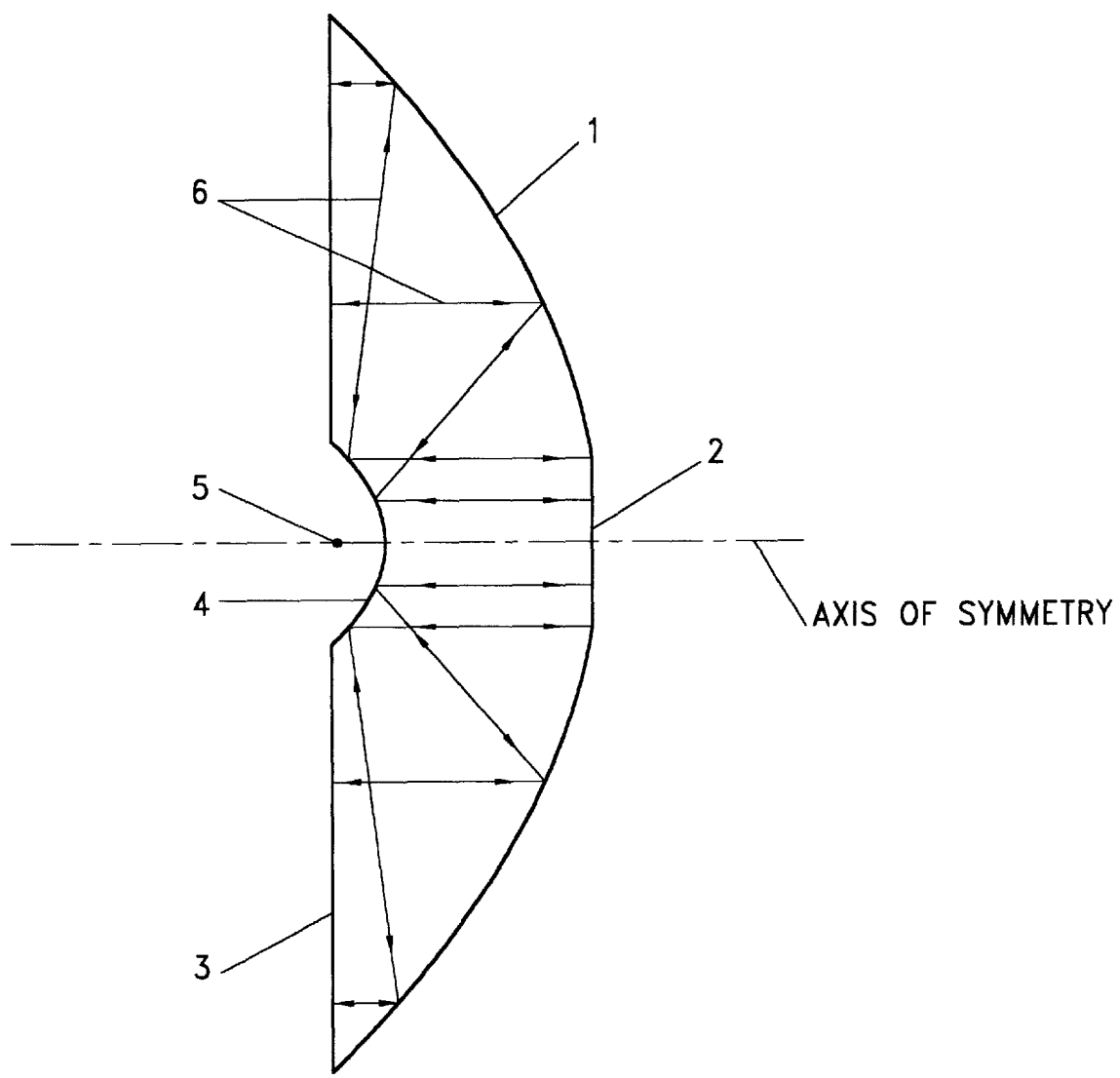

LOW LOSS RESONATOR

CROSS-REFERENCE TO RELATED APPLICATIONS

Not Applicable

STATEMENT REGARDING FEDERALY SPONSORED RESEARCH OR DEVELOPMENT

Not Applicable

REFERENCE TO A MICROFICHE APPENDIX

Not Applicable

BACKGROUND OF THE INVENTION

The present invention relates to lasers resonant cavities, specifically to a Low loss resonator to be used as a laser oscillator with the object of improve the performance of a laser resonant cavity.

In the prior art, several configurations are possible for laser resonators, being the most common a pair of mirrors on either end of a cylindrical tube. If stimulated emissions occurs on the axis between the two mirrors, it is reflected back and forth through the tube. Stimulated emissions in other directions are lost out of the laser medium. This cavity losses limit the positive feedback and the degree of amplification. Specifically these cavity losses are the ones that the present invention is intended to minimize.

BRIEF SUMMARY OF THE INVENTION

Accordingly, it is an object of the present invention to provide a laser resonant cavity that avoids the disadvantages of the prior art.

More particularly, it is an object of the present invention to provide a Low loss resonator whose performance is improved by directing, towards the output window, stimulated emissions generated in the active medium at multiple axes, the ones parallels to the axis of symmetry, and the radial axes originated at the common focal point of the parabolic reflectors. This feature improves the efficiency of the resonant cavity of a laser.

The main advantage of the Low loss resonator is that it extracts energy from the active medium more efficiently than cylindrical shaped resonators.

Another feature and advantage at the same time of the Low loss resonator, is that it has more useful reflective surface per volume of active medium than a conventional cylindrical shaped resonant cavity.

The novel features which are considered characteristic for the present invention are set forth in particular in the appended claim. The invention itself, however, both as to its structure, its method of operation and advantages thereof, will be best understood from the following descriptions when read in connection with the accompanying drawing.

BRIEF DESCRIPTION OF THE SEVERAL VIEWS OF THE DRAWING

Only one view is provided, and represents a symmetrical cut of the Low loss resonator.

DETAILED DESCRIPTION OF THE INVENTION

Referring to the drawing, the Low loss resonator, consist in a frontal parabolic reflector 1 which has attached on its vertex a frontal flat reflector 2 that perform the function of output window. Said frontal parabolic reflector is attached by its borders to a rear flat reflector 3 which has attached on its center a rear parabolic reflector 4 with its convex side facing the vertex of the frontal parabolic reflector 1. All four elements form a closed cavity, with all their internal sides mirrored.

Both parabolic reflectors have a common focal point 5, which has to be located at the same level of the rear flat reflector 3, slightly located towards the inside of the cavity so the stimulated emissions reflected from the frontal parabolic reflector 1 near the edges, or area close to the attached rear flat reflector 3 can reach the rear parabolic reflector 4.

When stimulated emissions are generated in the cavity in an axis parallel to the axis of symmetry or in a radial axis, being the point of origin of the radial axes the common focal point of the parabolic reflectors, it follows a path bouncing back and forth between the four mirrors until it escapes thru the output window 2. The stimulated emissions path 6 is possible thanks to the reflecting properties of the flat and parabolic surfaces that form the cavity.

What I claim as my invention is:

1. A resonant cavity comprising:
    a frontal parabolic reflector;
    a frontal flat reflector, attached at a vertex of said frontal parabolic reflector;
    a rear flat reflector larger than said frontal flat reflector, attached to the borders of said frontal parabolic reflector;
    a rear parabolic reflector smaller than said frontal parabolic reflector, attached to the center of said rear flat reflector with its convex side facing the vertex of said frontal parabolic reflector; and
    means to form together a closed cavity thereby directing stimulated emissions in multiple parallel axis to exit though said frontal flat reflector, which is the output window, and wherein the focal points of said frontal and rear parabolic reflectors coincide.

* * * * *